Dec. 1, 1953  S. W. WRIGHT ET AL  2,661,254
JOURNAL BEARING

Filed Jan. 20, 1951  2 Sheets-Sheet 1

INVENTORS
Stephen W. Wright
& Phil P. Love
by
Wise, Mackey & Dunden
Their Attys.

Dec. 1, 1953   S. W. WRIGHT ET AL   2,661,254
JOURNAL BEARING
Filed Jan. 20, 1951   2 Sheets-Sheet 2

INVENTORS
Stephen W. Wright
and
Phil P. Love
by
Webb, Mackey & Durden.
Their Attys.

UNITED STATES PATENT OFFICE 2,661,254

JOURNAL BEARING

Stephen W. Wright and Phil P. Love, Alperton, Wembley, England, assignors to Johnson Bronze Company, New Castle, Pa., a corporation of Pennsylvania Application January 20, 1951, Serial No. 206,986

Claims priority, application Great Britain January 23, 1950

5 Claims. (Cl. 308—79)

This invention relates to journal bearings, and is particularly concerned with an improved journal bearing assemblage for axles of railway vehicles, such as locomotives, coaches, waggons, mine tubs, and the like.

In such journal bearing assemblages, full fluid lubrication at all times, and particularly in the period immediately following a long rest period, is most desirable, and many devices with this end in view have been proposed. For instance, oil reservoirs with wick feed have been utilised, but none of the devices heretofore proposed has proved to be entirely satisfactory.

The present invention has for its object to provide an improved journal bearing assemblage whereby, in a simple and effective manner, full fluid lubrication may be attained.

According to the present invention, a journal bearing assemblage comprises means which, on rotation of the journal, is adapted, by hydrodynamic action, to raise oil from a reservoir below the bearing for delivery at a higher level for flow to the bearing surface.

More specifically, the invention includes a journal bearing assemblage comprising a normally stationary ring element surrounding part of the axle with suitable clearance, said element having a shallow helical groove in its bore, the ends of which communicate with passages respectively for drawing oil from the reservoir beneath the bearing and for delivering oil to the bearing surface.

The oil raised from the lower reservoir on rotation of the axle may be delivered to an upper reservoir or guideway leading to a passage or passages for delivering oil to the bearing surface.

In journal bearing assemblages of the kind in question, the axle is subject to a reversal of rotation, and in order that the improved assemblage according to the invention may function effectively irrespective of the direction of rotation, the normally stationary ring element is freely displaceable to a limited angular extent, determined by stop means, about its axis so that, according to the direction of rotation of the axle, the appropriate end of the helical groove is placed in communication with the lower reservoir and the other end for delivery of oil to the bearing, it being understood that such angular displacement of the ring element is effected by frictional drag between ring element and axle immediately on reversal of the direction of rotation of the axle.

Conveniently, the ring element is made in two semi-cylindrical parts bolted together to facilitate assembly, and in a preferred embodiment the helical groove in the ring element communicates at its ends through passages with projecting pipes or nozzles disposed so that in one position of the ring element, one pipe or nozzle dips into the oil in the reservoir beneath the bearing, and the other pipe or nozzle delivers oil above the bearing, while, on reversal of the axle and consequent angular displacement of the ring element, the disposition of the pipes or nozzles is reversed. Thus, although reversal of direction of rotation of the axle reverses the direction of pumping through the helical groove, the angular displacement of the ring element positions the pipes so that, irrespective of the direction of rotation, oil is raised from the reservoir and delivered above the bearing.

The invention is hereinafter described, by way of example, with reference to the accompanying diagrammatic drawings, in which.

Figure 1:
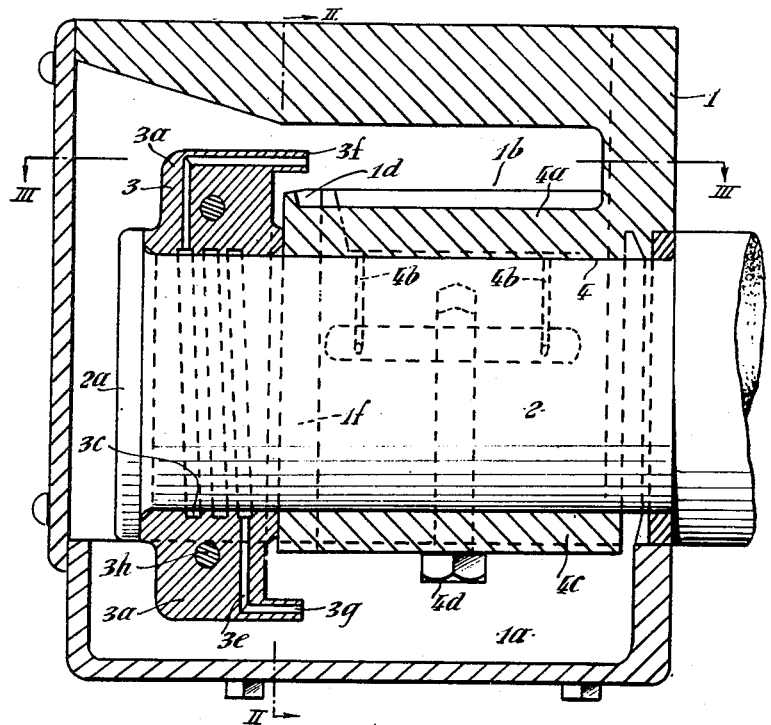
Fig. 1 is a sectional elevation on the line I—I of Fig. 2, illustrating a journal bearing assemblage in accordance with the invention.
Figure 3:
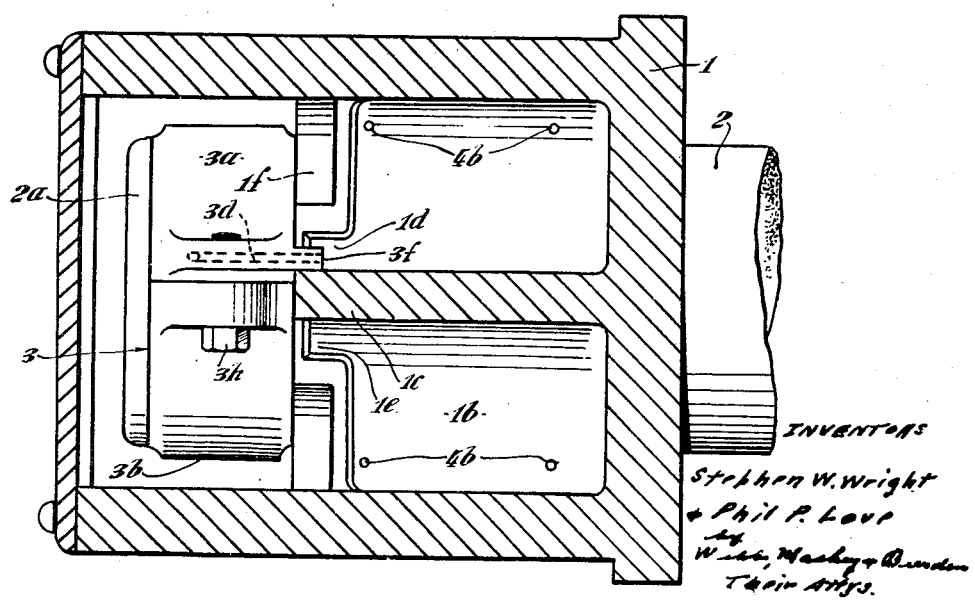
Fig. 3 is a sectional plan on the line III—III, of Fig. 1.

In carrying the invention into effect in its application, for example, to a journal bearing assemblage for an axle box of a railway vehicle, and as shown in the accompanying diagrammatic drawings, a bearing 4 in the axle box 1 is made somewhat shorter than in the conventional arrangement so as to provide space adjacent the outer end 2a of the journal 2 for a floating ring element 3 which surrounds the journal 2 with small clearance and is of suitable length, for example, 1 to 1½ inches. The relatively small reduction in the effective length of the bearing 4 does not materially affect the load-carrying capacity of the bearing, inasmuch as the length of journal and bearing normally used is generally in excess of requirements.

The upper half 4a of the bearing 4 in the axle box or housing 1 is provided with oil holes or passages 4b at the upper part for introduction of oil to the bearing surface, the oil draining from the lower part 4c of the bearing which is fixed to the upper part 4a by bolts 4d, into a reservoir 1a in or fixed to the lower part of the axle box or housing 1. A reservoir 1b also may be formed or provided in the upper part of the axle box or housing 1 to receive oil for delivery through the said oil holes or passages 4b to the bearing surface.

The ring element 3 conveniently may be made in two half parts 3a, 3b held together by bolts 3h so as to be readily applied over the end 2a of the journal 2 which is frequently flanged, and is provided in its bore with a shallow helical groove 3c which does not extend to the ends of the ring element 3 and is therefore blind, the ends of the helical groove 3c communicating through passages 3d, 3e respectively with projecting pipes or nozzles 3f, 3g arranged to extend over and beyond the adjacent end of the bearing. The ring element 3 is freely rotatable on the journal 2 within limits determined by suitable stop means. For example, the pipes or nozzles 3f, 3g may co-operate with a stop 1c in the bearing or axle box or housing 1, the arrangement being such that in one position, the pipe or nozzle 3g is disposed so as to dip into oil in the reservoir 1a beneath the bearing 4, while the other pipe or nozzle 3f extends above the bearing for delivery of oil into the said upper reservoir 1b. In the other extreme position of the said ring element 3, the position of the pipes or nozzles 3f, 3g is reversed.

During the reversing movement of the element, the projecting pipes or nozzles 3f, 3g traverse the passage 5 between a projecting part 1f and the wall of the axle box or housing 1. When the projecting pipes or nozzles 3f, 3g are positioned against the stop 1c, they deliver oil into the respective projecting parts 1d, 1e of the upper reservoir 1b.

Figure 2:
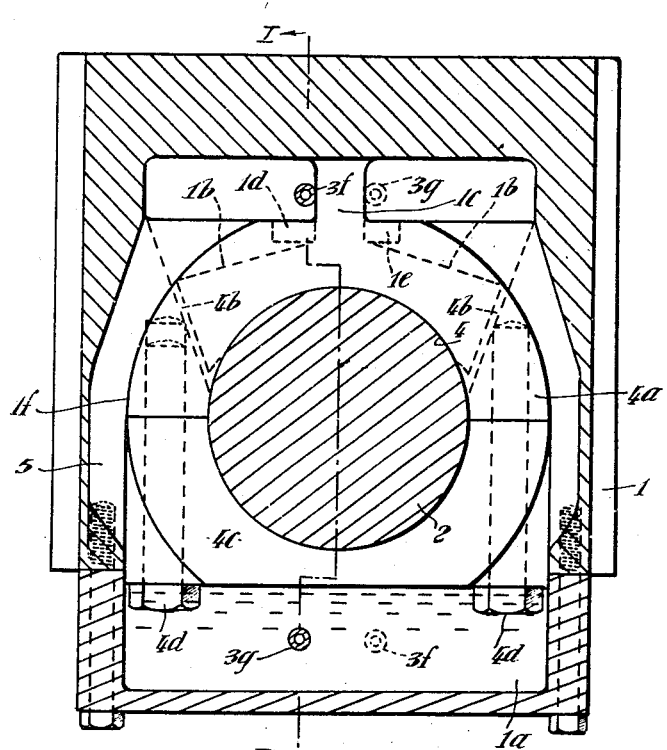
Fig. 2 is a section on the line II—II of Fig. 1.
Figure 4:
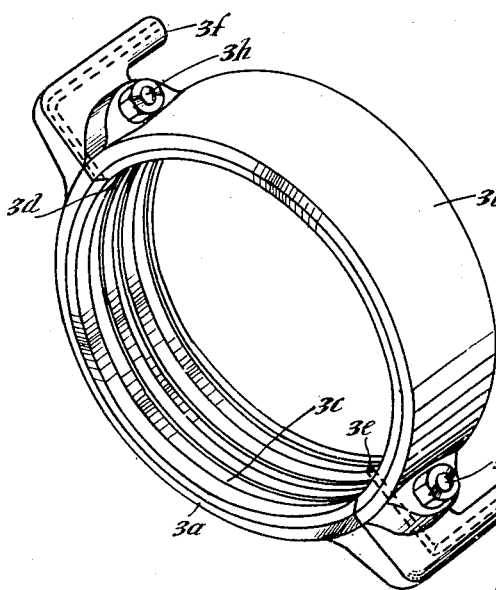
Fig. 4 is a perspective view of the helically grooved ring element.

The arrangement is such that, according to the direction of rotation of the journal, the ring element 3 is so positioned that the pumping action of the helical groove 3c in the ring element raises oil from the lower reservoir 1a and delivers it into the upper reservoir 1b so that, at all times, there is continuous circulation of oil for maintaining full fluid lubrication of the bearing 4. The said pipes or nozzles 3f, 3g may be arranged in opposite positions on the one part 3a of the ring element 3, the angular displacement of the element 3, when the direction of rotation of the journal is reversed, being somewhat less than a half turn so as to reverse the positions and functions of the pipes or nozzles 3f, 3g as shown by the broken circles in Fig. 2.

The pipes or nozzles 3f, 3g may be bent and/or restricted at their open ends so as to inhibit the drainage of oil therefrom during the reversal operation.

The invention can be applied to existing vehicles without the necessity of modifying the axles thereof.

It will be understood that the invention is not limited to the particular embodiment hereinbefore described. For example, instead of providing projecting pipes or nozzles as before described, the ring element may be provided with passages coacting with suitable ports, one of which communicates with the lower reservoir, while the upper communicates with an upper reservoir or delivers into a suitable channel or guideway at the upper part of the bearing. Furthermore, such pipes or ports are not necessarily disposed at diametrically opposite positions but may be arranged in any other suitable manner providing that, when one pipe or port is in a lower position for drawing oil from the reservoir beneath the bearing, the other pipe or port is sufficiently elevated to deliver oil to the bearing surface, the extent of angular displacement of the ring element being suitably related to the relative disposition of the pipes or ports.

In another embodiment of the invention, the ports of the ring element may register with ports in the main bearing housing, whereby the helically grooved ring element may deliver lubricant with a positive supply pressure direct to the main bearing. Sealing of the ports at the point of register may be attained by the viscous torque reaction on the ring element.

For effective lubrication it is not essential that the oil should be raised to a level above the top of the journal as shown, provided that the oil is raised to a sufficiently high level for delivery to any part or parts of the bearing surface.

We claim:

1. In an assembly including an axle and a bearing therefor having a reservoir containing oil: a lubricator comprising a ring member adapted for limited pivotable engagement with the axle, said ring member having a circumferential helical groove whereby, according to the direction of rotation of the axle, one of the ends of the groove is placed in contact with the oil in the reservoir and the other end is positioned for delivering the oil above the reservoir.

2. A journal bearing assembly comprising an axle, a bearing therefor, a ring element mounted freely on and surrounding part of the axle extending from the journal bearing, said ring element having a helical groove in its bore, the ends of the groove communicating respectively with a reservoir beneath the bearing and a bearing surface, a stop having a fixed relation with the bearing, stop-engaging means movable with the ring element whereby, regardless of the direction of rotation of the axle, one end of the helical groove is placed in communication with the reservoir and the other end is positioned for delivery of oil to the bearing surface.

3. A journal bearing assembly as claimed in claim 2 wherein the bearing has a reservoir above the axle for receiving the oil raised from the reservoir beneath the axle upon rotation of the latter, and a passage leading from the upper reservoir to a bearing surface.

4. A journal bearing assembly as claimed in claim 2 wherein the ring element comprises two semi-cylindrical parts bolted together.

5. A journal bearing assembly as claimed in claim 2 wherein the helical groove in the ring element communicates at each end through a passage with a projecting nozzle whereby, in one position of the ring element, one nozzle dips into the oil in the reservoir beneath the bearing and the other nozzle delivers oil above the bearing, and whereby on reversal of the axle and consequent angular displacement of the ring element, the disposition of the nozzles is reversed.

STEPHEN W. WRIGHT.
PHIL P. LOVE.

References Cited in the file of this patent

UNITED STATES PATENTS

| Number | Name | Date |
|---|---|---|
| 381,691 | Godley | Apr. 24, 1888 |
| 934,622 | Newman | Sept. 21, 1909 |

FOREIGN PATENTS

| Number | Country | Date |
|---|---|---|
| 21,833 | Great Britain | 1912 |
| 260,964 | Germany | May 25, 1911 |
| 695,210 | France | Dec. 12, 1930 |